US009511685B2

(12) United States Patent
Enokijima

(10) Patent No.: US 9,511,685 B2
(45) Date of Patent: Dec. 6, 2016

(54) POWER SEAT SLIDING APPARATUS

(71) Applicant: SHIROKI CORPORATION, Kanagawa (JP)

(72) Inventor: Tomohiro Enokijima, Aichi (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 682 days.

(21) Appl. No.: 13/746,746

(22) Filed: Jan. 22, 2013

(65) Prior Publication Data

US 2013/0186217 A1    Jul. 25, 2013

(30) Foreign Application Priority Data

Jan. 24, 2012  (JP) .................................. 2012-11899
Nov. 19, 2012  (JP) .................................. 2012-253451

(51) Int. Cl.
 *B60N 2/07*  (2006.01)
 *B60N 2/08*  (2006.01)
 *B60N 2/06*  (2006.01)

(52) U.S. Cl.
 CPC ............. *B60N 2/0722* (2013.01); *B60N 2/067* (2013.01); *B60N 2/07* (2013.01); *B60N 2/0705* (2013.01); *B60N 2/0825* (2013.01); *Y10T 74/18656* (2015.01)

(58) Field of Classification Search
 CPC ........ B60N 2/08; B60N 2/12; B60N 2/0818; B60N 2/085; B60N 2/07; B60N 2/0722; B60N 2/0715; B60N 2/0705; B60N 2/0825
 USPC ............. 248/424, 425, 429, 430; 297/65.13, 297/65.15, 344.11
 See application file for complete search history.

(56) References Cited

U.S. PATENT DOCUMENTS

| | | | | |
|---|---|---|---|---|
| 5,342,013 A | * | 8/1994 | Ito et al. ........................ | 248/429 |
| 5,447,352 A | * | 9/1995 | Ito et al. .................... | 296/65.14 |
| 5,816,555 A | * | 10/1998 | Ito et al. ........................ | 248/429 |
| 5,860,319 A | * | 1/1999 | Via ............................... | 74/89.36 |
| 5,873,558 A | * | 2/1999 | Sakamoto ..................... | 248/429 |
| 6,220,642 B1 | * | 4/2001 | Ito et al. .................... | 296/65.14 |
| 6,244,660 B1 | * | 6/2001 | Yoshimatsu ................ | 297/344.1 |
| 6,334,600 B1 | * | 1/2002 | Sakamoto ..................... | 248/424 |
| 6,857,612 B2 | * | 2/2005 | Goodbred ..................... | 248/429 |
| 6,948,693 B2 | * | 9/2005 | Goodbred ............... | B60N 2/067 248/424 |
| 7,070,155 B2 | * | 7/2006 | Garrido et al. ............... | 248/424 |

(Continued)

FOREIGN PATENT DOCUMENTS

| | | |
|---|---|---|
| JP | 2007-055557 | 3/2007 |
| JP | 2010-006098 A | 1/2010 |
| JP | 2010-047091 A | 3/2010 |

*Primary Examiner* — Nkeisha Smith
(74) *Attorney, Agent, or Firm* — McGinn IP Law Group, PLLC

(57) ABSTRACT

A power seat sliding apparatus does not produce an unusual sound and a good operation feeling is obtained. The power seat sliding apparatus includes a first load transmission member fixedly attached to an upper rail and having a first surface that intersects with an axis of a threaded rod and a second surface that opposes the first surface with a space in between, and a second load transmission member installed in the space between the first surface and the second surface, fixedly attached to the threaded rod, and having a third surface on which to abut the first surface and a fourth surface on which to abut the second surface. The first surface and the second surface are concave curved surfaces and the third surface and the fourth surface are convex curved surfaces.

10 Claims, 13 Drawing Sheets

(56) References Cited

U.S. PATENT DOCUMENTS

| | | | |
|---|---|---|---|
| 7,325,851 B2* | 2/2008 | Ito et al. | 296/65.13 |
| 7,422,186 B2* | 9/2008 | Kropfreiter et al. | 248/429 |
| 7,556,234 B2* | 7/2009 | Ito et al. | 248/429 |
| 7,597,303 B2* | 10/2009 | Kimura et al. | 248/429 |
| 7,641,164 B2* | 1/2010 | Nakamura | 248/424 |
| 7,658,429 B2* | 2/2010 | Koga et al. | 296/65.15 |
| 7,661,647 B2* | 2/2010 | Ito | 248/429 |
| 7,762,514 B2* | 7/2010 | Koga et al. | 248/429 |
| 7,810,780 B2* | 10/2010 | Koga et al. | 248/430 |
| 8,038,197 B2* | 10/2011 | Koga | 296/65.18 |
| 8,061,756 B2* | 11/2011 | Kimata et al. | 296/65.17 |
| 8,226,063 B2* | 7/2012 | Weber | 248/429 |
| 8,256,822 B2* | 9/2012 | Koga et al. | 296/65.15 |
| 8,464,993 B2* | 6/2013 | Muraishi | 248/429 |
| 8,490,940 B2* | 7/2013 | Ito et al. | 248/429 |
| 8,523,263 B2* | 9/2013 | Kimura et al. | 296/65.13 |
| 8,646,742 B2* | 2/2014 | Hayashi et al. | 248/430 |
| 8,708,300 B2* | 4/2014 | Fujishiro et al. | 248/429 |
| 8,733,725 B2* | 5/2014 | Kimura et al. | 248/429 |
| 8,820,694 B2* | 9/2014 | Tarusawa et al. | 248/430 |
| 2004/0206878 A1* | 10/2004 | Borbe et al. | 248/424 |
| 2005/0116132 A1* | 6/2005 | Sakamaki | 248/424 |
| 2005/0253036 A1* | 11/2005 | Li et al. | 248/424 |
| 2006/0237619 A1* | 10/2006 | Nakamura | 248/429 |
| 2006/0289717 A1* | 12/2006 | Ito | 248/419 |
| 2009/0236488 A1* | 9/2009 | Koga et al. | 248/429 |
| 2009/0243327 A1* | 10/2009 | Koga et al. | 296/65.15 |
| 2010/0044542 A1* | 2/2010 | Koga | 248/429 |
| 2010/0065708 A1* | 3/2010 | Koga | 248/429 |
| 2010/0288903 A1* | 11/2010 | Koga et al. | 248/429 |
| 2011/0095160 A1* | 4/2011 | Kimura et al. | 248/429 |
| 2011/0278875 A1* | 11/2011 | Couasnon | 296/65.13 |
| 2015/0090856 A1* | 4/2015 | Morishita et al. | 248/429 |

\* cited by examiner

POWER SEAT SLIDING APPARATUS

BACKGROUND OF THE INVENTION

Field of the Invention

The present invention relates to a power seat sliding apparatus that slides a seat with respect to a floor using motors.

Description of the Related Art

There is a power seat sliding apparatus that slides a seat using motors, for example, as is shown in FIGS. 13 and 14.

FIG. 13 is a longitudinal cross section of a power seat sliding apparatus in the related art. FIG. 14 is an enlarged view of a support member portion of FIG. 13. Referring to these drawings, a lower rail 1 installed on a floor side is engaged in a movable manner with an upper rail 3 on which to install a seat.

A threaded rod 5 that is male-threaded on a peripheral surface is installed to the upper rail 3 along a longitudinal direction.

A gearbox 7 is provided at one end of the upper rail 3. Installed in the gearbox 7 is a gear reduction mechanism formed of a worm 9 driven by an unillustrated motor and a worm wheel 11 that meshes with the worm 9. One end of the threaded rod 5 is connected to the worm wheel 11 on an output side of the gear reduction mechanism. The other end of the threaded rod 5 is supported in a rotatable manner on the upper rail 3 with an unillustrated bearing bracket.

A nut member 13 is fixed to the lower rail 1 using a bracket 15. The nut member 13 is provided with a through-hole 13a that is female-threaded on an inner peripheral surface. The threaded rod 5 is threaded into the through-hole 13a of the nut member 13.

Hence, the upper rail 3 moves along the lower rail 1 as the threaded rod 5 is driven to rotate by the unillustrated motor.

In the power seat sliding apparatus configured as above, a load acting on the seat is transmitted to the floor sequentially through the upper rail 3, the threaded rod 5, the nut member 13, the bracket 15, and the lower rail 1. Herein, suppose that a load is transmitted from the upper rail 3 to the threaded rod 5 via the gear box 7, the gearbox 7 may possibly undergo deformation or break. In consideration of this inconvenience, a load transmission mechanism 21 is provided to lessen a load transmitted by way of the gearbox 7.

The load transmission mechanism 21 will now be described using FIG. 13 and FIG. 14.

The worm wheel 11 of the gearbox 7 and the threaded rod 5 are connected by means of serration so that the worm wheel 11 and the threaded rod 5 are allowed to move freely in an axial direction.

A washer 23 and a washer 25 as a first load transmission member are fixed to the threaded rod 5 with a space in between. A support member 27 as a second load transmission member is installed between the washer 23 and the washer 25. The support member 27 is formed of a main body portion 27b provided with a through-hole 27a having an inner diameter set larger than an outer diameter of the threaded rod 5 and an attachment portion 27c formed continuously from the main body portion 27b and attached to the upper rail 3 using a nut 29. The threaded rod 5 is inserted into the through-hole 27a of the support member 27.

Each of the main body portion 27b of the support member 27, the washer 23, and the washer 25 is formed as follows:

(1) a first surface 23a of the washer 23, which is a surface opposing the washer 25, abuts on a third surface 27d of the main body portion 27b of the support member 27, which is a surface opposing the first surface 23a of the washer 23; and (2) a second surface 25a of the washer 25, which is a surface opposing the washer 23, abuts on a fourth surface 27e of the main body portion 27b of the support member 27, which is a surface opposing the second surface 25a of the washer 25.

When configured in this manner, most of a load transmitted from the upper rail 3 to the floor is transmitted to the floor sequentially through the support member 27, the washer 23 or the washer 25, the threaded rod 5, the nut member 13, the bracket 15, and the lower rail 1. An example of this configuration is described, for example, in JP-A-2007-55557.

BRIEF SUMMARY OF THE INVENTION

The power seat sliding apparatus configured as shown in FIG. 13 and FIG. 14, however, has a problem that errors of component accuracy of the washer 23, the washer 25, and the support member 27, errors of attachment accuracy of the washer 23 and the washer 25 to the threaded rod 5, and errors of attachment accuracy of the support member 27 to the upper rail 3 give rise to an unusual sound on an abutment surface of the first surface 23a of the washer 23 and the third surface 27d of the support member 27 and an abutment surface of the second surface 25a of the washer 25 and the fourth surface 27e of the support member 27 when the threaded rod 5 rotates and therefore an operational feeling is poor.

The invention is devised in view of the problem above and has an object to provide a power seat sliding apparatus that does not produce an unusual sound and therefore makes an operational feeling better.

In order to overcome the problem above, a power seat sliding apparatus according to one aspect of the invention includes: a first rail provided on one of a floor side and a seat side; a second rail provided on the other one of the floor side and the seat side and engaged with the first rail in a relatively movable manner; a threaded rod installed along the first rail and supported on the first rail in a rotatable manner; a nut member fixed to the second rail and screwed together with the threaded rod; a gearbox driven by a motor and driving the threaded rod to rotate; a first load transmission member fixedly attached to one of the threaded rod and the first rail and having a first surface orthogonal to an axis of the threaded rod and a second surface opposing the first surface with a space in between; and a second load transmission member installed in the space between the first surface and the second surface, fixedly attached to the other one of the threaded rod and the first rail, and having a third surface that abuts on the first surface and a fourth surface that abuts on the second surface. At least one of the first surface and the third surface is a convex curved surface, and at least one of the second surface and the fourth surface is a convex curved surface.

The power seat sliding apparatus is configured in such a manner that at least one of the first surface and the third surface is a convex curved surface and at least one of the second surface and the fourth surface is a convex curved surface. Owing to this configuration, errors of component accuracy and attachment accuracy of the first load transmission member and the second load transmission member are absorbed in an abutment portion of the first surface of the first load transmission member and the third surface of the second load transmission member and an abutment portion of the second surface of the first load transmission member and the fourth surface of the second load transmission member. Hence, no unusual sound is produced and an operational feeling becomes better.

The foregoing and other objects, features, aspects, and advantages of the present invention will become more apparent from the following detailed description of the present invention when taken conjunction with the accompanying drawings.

DETAILED DESCRIPTION OF THE INVENTION

Hereinafter, embodiments of the invention will be described using the drawings.

Figure 5:
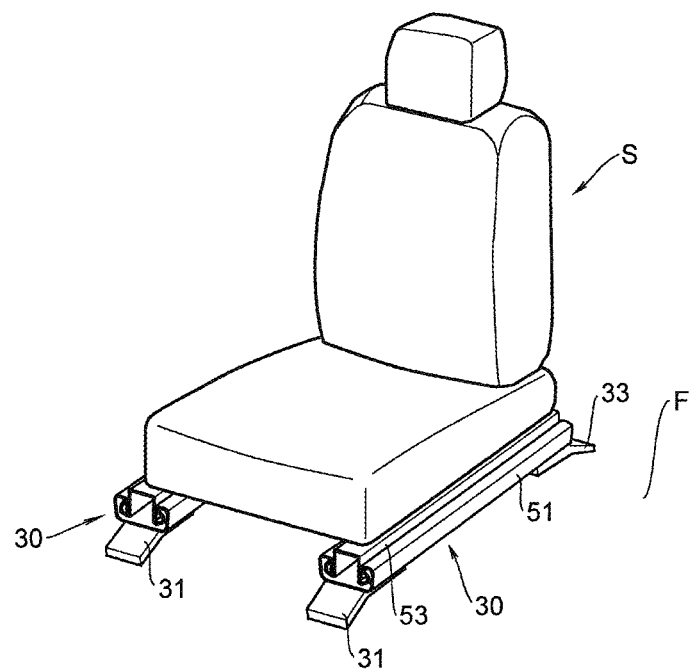
FIG. 5 is a view used to describe a seat equipped with the power seat sliding apparatus of the invention.

Firstly, an overall configuration of a seat will be described using FIG. 5. FIG. 5 is a view used to describe a seat equipped with a power seat sliding apparatus of the invention.

The power seat sliding apparatus is positioned between a vehicle seat S and a floor surface F and has a pair of seat tracks 30 in the right and left each extending in a front-rear direction of a vehicle. The seat tracks 30 in the right and left are of the same (symmetrical) structure and each has a lower rail 51 fixed to the floor surface F with front and rear brackets 31 and 33 and an upper rail 53 fixed to the seat S. Further, the upper rail 53 engages with the lower rail 51 in a movable manner.

First Embodiment

Figure 1:
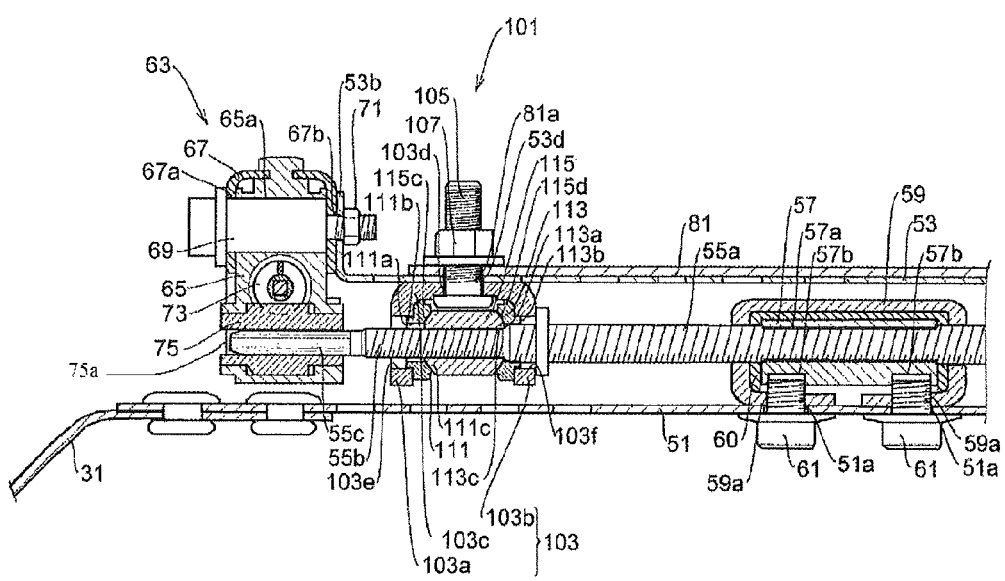
FIG. 1 is an enlarged view of portion covering a first load transmission member and a second load transmission member of FIG. 2 to show an inventive portion of a first embodiment.
Figure 2:
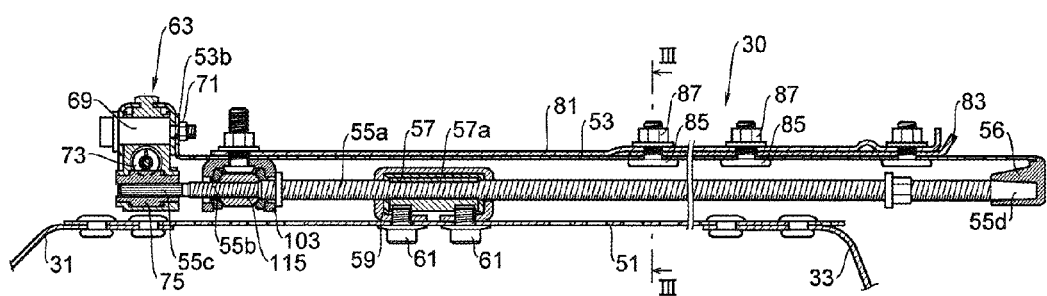
FIG. 2 is a longitudinal cross section of a power seat sliding apparatus of the first embodiment.
Figure 3:
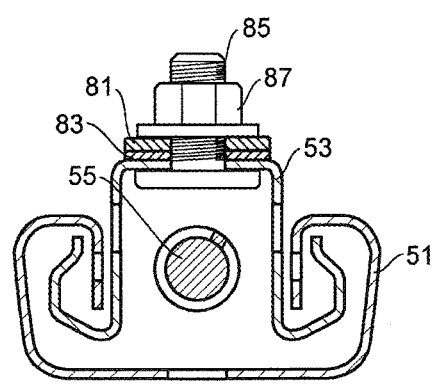
FIG. 3 is a cross section taken on the line III-III of FIG. 2.

An overall configuration of a power seat sliding apparatus of a first embodiment will now be described using FIG. 1, FIG. 2, and FIG. 3. FIG. 1 is an enlarged view of a first load transmission member and a second load transmission member of FIG. 2 to show an inventive portion of the first embodiment. FIG. 2 is a longitudinal cross section of the power seat sliding apparatus of this embodiment. FIG. 3 is a cross section taken on the line III-III of FIG. 2.

Referring to these drawings, a threaded rod 55 is installed in the upper rail 53 along a longitudinal direction. A center portion of the threaded rod 55 is a main body portion 55a that is male-threaded on a peripheral surface. At one end (front side), the threaded rod 55 is provided with a small-diameter step portion 55b formed continuously from the main body portion 55a with an outer diameter set smaller than an outer diameter of the main body portion 55a and male-threaded on a peripheral portion, and a serration portion 55c formed continuously from the small-diameter step portion 55b with an outer diameter set smaller than the outer diameter of the small-diameter step portion 55b and serrated on a peripheral surface in an axial extending direction. At the other end (rear side), the threaded rod 55 is provided with a conical platform portion 55d formed continuously from the main body portion 55a with an outer diameter that gradually becomes smaller toward an end face. A bracket 56 is attached to the upper rail 53 and the conical platform portion 55d of the threaded rod 55 is inserted into the bracket 56 so that the threaded rod 55 is supported in a rotatable manner.

A nut member 57 is installed to the lower rail 51. The nut member 57 is provided with a through-hole 57a that is female-threaded on an inner peripheral surface. The main body portion 55a of the threaded rod 55 is threaded into the through-hole 57a of the nut member 57. A bracket 59 is provided so as to cover the nut member 57. A rubber sheet 60 for vibrational absorption is provided in a space between an inner surface of the bracket 59 and an outer surface of the nut member 57. A screw hole 57b that is female-threaded on a peripheral surface is provided at two points in a lower surface of the nut member 57. Also, holes 59a having a diameter larger than a diameter of troughs of the screw holes 57b are provided oppositely to the respective screw holes 57b of the nut member 57 in a lower surface of the bracket 59. Further, holes 51a having a diameter larger than the diameter of the troughs of the screw holes 57b of the nut members 57 are provided oppositely to the respective holes 59a of the bracket 59 in a bottom portion of the lower rail 51. The nut member 57 and the bracket 59 are fixed to the lower rail 51 by bolts 61 inserted through the holes 51a of the lower rail 51 and the holes 59a of the bracket 59 and threaded into the screw holes 57b of the nut member 57.

A bent portion 53b bent upward is provided at one end (front portion) of the upper rail 53. A gearbox 63 is installed to the bent portion 53b.

The gearbox 63 has a housing 65 and a cover 67 by which an upper portion of the housing 65 is covered and also to which the housing 65 is attached. The gearbox 63 is attached to the bent portion 53b of the upper rail 53 by a bolt 69 inserted through a hole 67a provided to the cover 67, a through-hole 65a provided to the housing 65, a hole 67b provided to the cover 67, and a hole provided to the bent portion 53b of the upper rail 53 and a nut 71 screwed together with the bolt 69.

Installed inside the housing 65 of the gearbox 63 is a gear reduction mechanism formed of a worm 73 driven by an unillustrated motor and a worm wheel 75 meshed with the worm 73. The worm wheel 75 on an output side of the gear reduction mechanism is provided with a hole 75a centered on a central axis of rotation and serrated on an inner peripheral surface. The serration portion 55c of the threaded rod 55 is fit into the hole 75a of the worm wheel 75. Owing to this serration fitting, the worm wheel 75 and the threaded rod 55 rotate integrally while the worm wheel 75 and the threaded rod 55 are allowed to move relatively with respect to each other in a direction of the rotation axis.

A bent bottom portion of a first bracket 81 and a bent bottom portion of a second bracket 83 are attached to an upper surface of the upper rail 53 using bolts 85 and nuts 87.

Hence, the upper rail 53 moves along the lower rail 51 as the threaded rod 55 is driven to rotate by the unillustrated motor.

In the power seat sliding apparatus of this embodiment, a load acting on the seat is transmitted to the floor sequentially through the upper rail 53, the threaded rod 55, the nut member 57, the bracket 59, and the lower rail 51. Herein, suppose that a load is transmitted from the upper rail 53 to the threaded rod 55 through the gear box 63, the gearbox 63 may possibly undergo deformation or break. In consideration of this inconvenience, a load transmission mechanism 101 is provided to lessen a load transmitted by way of the gearbox 63.

Figure 4:
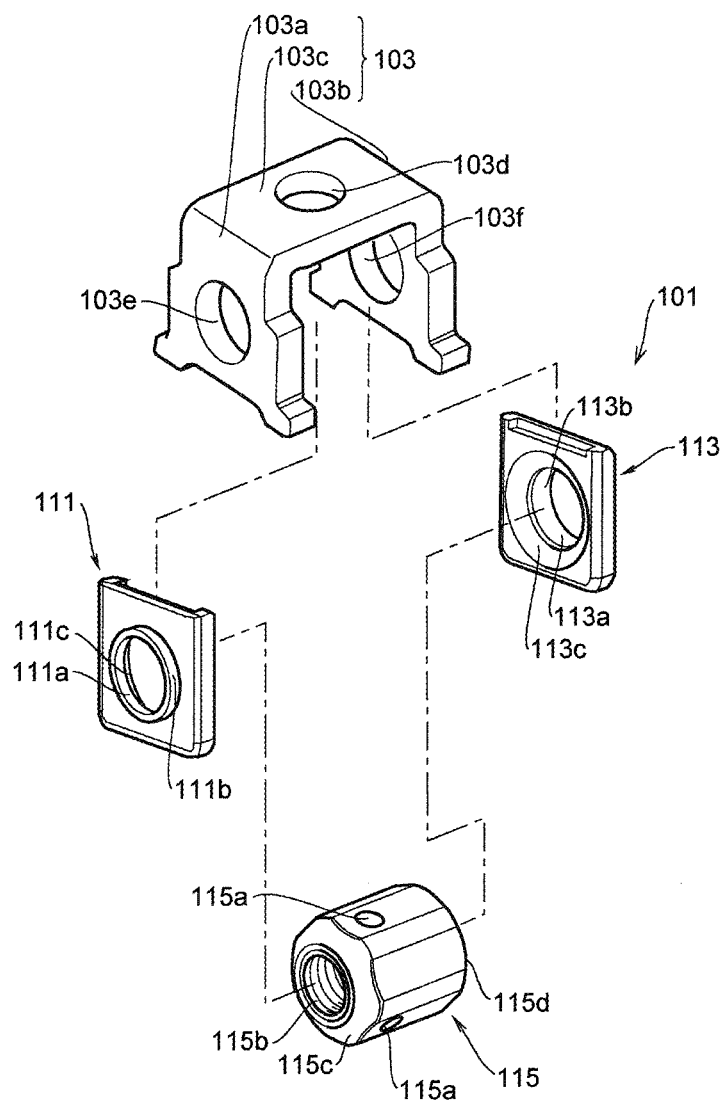
FIG. 4 is an exploded perspective view of a load transmission mechanism of FIG. 1.

The load transmission mechanism 101 of this embodiment will now be described using FIG. 1 through FIG. 4. FIG. 4 is an exploded perspective view of the load transmission mechanism 101 of FIG. 1.

The upper rail 53 is provided with a hole 53d in a ceiling portion having the upper surface at one end (front side). Also, the first bracket 81 is provided with a hole 81a oppositely to the hole 53d of the upper rail 53.

A bracket 103 is installed inside the upper rail 53. The bracket 103 is formed of a first standing wall portion 103a orthogonal to a movement direction of the upper rail 53, a second standing wall portion 103b opposing the first standing wall portion 103a with a space in between, and a bridge portion 103c bridging between an upper portion of the first standing wall portion 103a and an upper portion of the second standing wall portion 103b.

The bridging portion 103c is provided with a hole 103d at a center. The bracket 103 is attached to the upper rail 53 with a bolt 105 inserted through the hole 103d of the bracket 103, the hole 53d of the upper rail 53, and the hole 81a of the first bracket 81 and a nut 107 screwed together with the bolt 105.

The first standing wall portion 103a and the second standing wall portion 103b of the bracket 103 are provided, respectively, with a hole 103e and a hole 103f each having a diameter set larger than the outer diameter of the main body portion 55a of the threaded rod 55, and the threaded rod 55 is inserted through these holes 103e and 103f. In this embodiment, the small-diameter step portion 55b of the threaded rod 55 is inserted through the hole 103e of the first standing wall portion 103a and the main body portion 55a of the threaded rod 55 is inserted through the hole 103f of the second standing wall portion 103b.

A space-filling first bush 111 is installed to the first standing wall portion 103a of the bracket 103 on a surface opposing the second standing wall portion 103b. A space-filling second bush 113 of a same structure as the first bush 111 is installed to the second standing wall portion 103b of the bracket 103 on a surface opposing the first standing wall portion 103a.

The first bush 111 and the second bush 113 are provided, respectively, with holes 111a and 113a each having a diameter set larger than the outer diameter of the main body portion 55a of the threaded rod 55 and smaller than diameters of the hole 103e and the hole 103f of the first standing wall portion 103a and the second standing wall portion 103b, respectively, and the threaded rod 55 is inserted through these holes 111a and 113a. In this embodiment, the small-diameter step portion 55b of the threaded rod 55 is inserted through the hole 111a of the first bush 111 and the main body portion 55a of the threaded rod 55 is inserted through the hole 113a of the second bush 113.

The first bush 111 is provided with a cylinder portion 111b on a surface opposing the first standing wall portion 103a of the bracket 103 and along an opening rim of the hole 111a. The cylinder portion 111b attaches the first bush 111 to the first standing wall portion 103a of the bracket 103 by fitting into the hole 103e of the first standing wall portion 103a. Also, the second bush 113 is provided with a cylinder portion 113b on a surface opposing the second standing wall portion 103b of the bracket 103 and along an opening rim of the hole 113a. The cylinder portion 113b attaches the second bush 113 to the second standing wall portion 103b of the bracket 103 by fitting into the hole 103f of the second standing wall portion 103b.

A threaded rod fixing member 115 is installed between the first surface 111c of the first bush 111, which is a surface opposing the second bush 113, and the second surface 113c of the second bush 113, which is a surface opposing the first bush 111. The threaded rod fixing member 115 is provided with a through-hole 115b that is female-threaded on an inner peripheral surface, and the small-diameter step portion 55b of the threaded rod 55 is threaded into the through-hole 115b.

The threaded rod fixing member 115 is fixed to the threaded rod 55 so as to rotate integrally. In this embodiment, the threaded rod fixing member 115 and the threaded rod 55 are fixedly attached by smashing a part of the outer peripheral surface of the threaded rod fixing member 115 in a direction to the threaded rod 55 by press working. Referring to FIG. 4, portions deformed as a result of the press working are left as indentations 115a on the outer peripheral surface of the threaded rod fixing member 115.

One end face of the threaded rod fixing member 115 is a third surface 115c that abuts on the first surface 111c of the first bush 111. The other end face of the threaded rod fixing member 115 is a fourth surface 115d that abuts on the second surface 113c of the second bush 113.

In this embodiment, the first surface 111c of the first bush 111 is a concave curved surface whereas the third surface 115c of the threaded rod fixing member 115 is a convex curved surface. Further, the concave curved surface forming the first surface 111c and the convex curved surface forming the third surface 115c are spherical surfaces of a same radius centered on the rotation axis of the threaded rod 55.

Also, the second surface 113c of the second bush 113 is a concave curved surface whereas the fourth surface 115d of the threaded rod fixing member 115 is a convex curved surface. Further, the concave curved surface forming the second surface 113c and the convex curved surface forming the fourth surface 115d are spherical surfaces of a same radius centered on the rotation axis of the threaded rod 55.

Accordingly, the bracket 103, the first bush 111 attached to the first standing wall portion 103a of the bracket 103, and the second bush 113 attached to the second standing wall portion 103b of the bracket 103 together serve as a first load transmission member that has the first surface 111c orthogonal to the axis of the threaded rod 55 and the second surface 113c opposing the first surface 111c with a space in between and is fixedly attached to the upper rail 53. Also, the threaded rod fixing member 115 servers as a second load transmission member that is installed in a space between the first surface 111c and the second surface 113c and fixedly attached to the threaded rod 55, and has the third surface 115c on which to abut the first surface 111c and the fourth surface 115d on which to abut the second surface 113c.

Owing to the configuration above, errors of the component accuracy and the attachment accuracy of the first load transmission member and the second load transmission member are absorbed in an abutment portion of the first surface 111c of the first load transmission member and the third surface 115c of the second load transmission member and an abutment portion of the second surface 113c of the first load transmission member and the fourth surface 115d of the second load transmission member. Hence, no unusual sound is produced and an operational feeing becomes better.

It should be appreciated that the invention is not limited to the embodiment above. In the embodiment above, the first surface 111c of the first bush 111 is a concave curved surface, the third surface 115c of the threaded rod fixing member 115 is a convex curved surface, the second surface 113c of the second bush 113 is a concave curved surface, and the fourth surface 115d of the threaded rod fixing member 115 is a convex curved surface. However, a concave curved surface can be changed to a convex curved surface and vice versa, and it may be configured in such a manner that the first surface 111c of the first bush 111 is a convex curved surface. Likewise, it may be configured in such a manner that the third surface 115c of the threaded rod fixing member 115 is a concave curved surface, the second surface 113c of the second bush 113 is a convex curved surface, and the fourth surface 115d of the threaded rod fixing member 115 is a concave curved surface.

Also, in the embodiment above, one of the first surface and the third surface is a convex curved surface and the other is a concave surface surface. However, it is sufficient that at least one of the first and third surfaces is a convex curved surface. For example, it may be configured in such a manner that one surface is a convex curved surface and the other surface is a plane surface or the both surfaces are convex curved surfaces. The same applies to the second surface and the fourth surface.

Further, in the embodiment above, a spherical surface is used as the curved surfaces. It should be appreciated, however, that the curved surfaces are not limited to a spherical surface and can be other curved surfaces, such as an elliptical surface, a paraboloidal surface, and a hyperboloidal surface.

Furthermore, in the embodiment above, the gearbox 63 and the threaded rod 55 are provided on the side of the upper rail 53 and the nut member 57 is provided on the side of the lower rail 51. It should be appreciated, however, that it may be configured conversely in such a manner that the nut member 57 is provided on the side of the upper rail 53 and the gearbox 63 and the threaded rod 55 are provided on the side of the lower rail 51.

Second Embodiment

Figure 6:
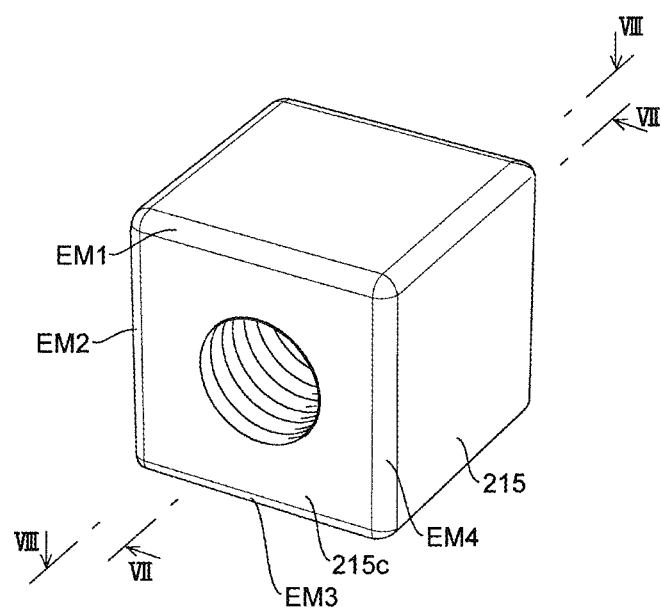
FIG. 6 is a perspective view of a threaded rod fixing member of a second embodiment.
Figure 7:
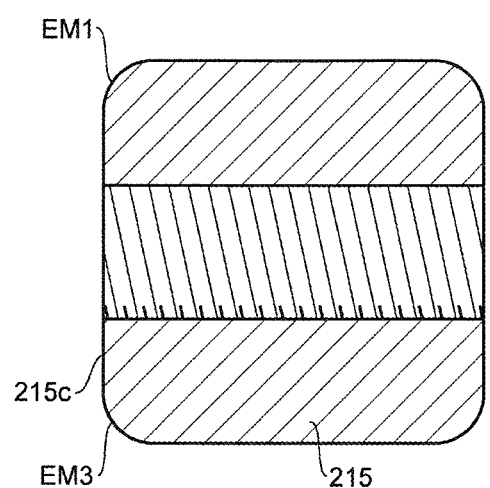
FIG. 7 is a cross section taken on the line VII-VII of FIG. 6.
Figure 8:
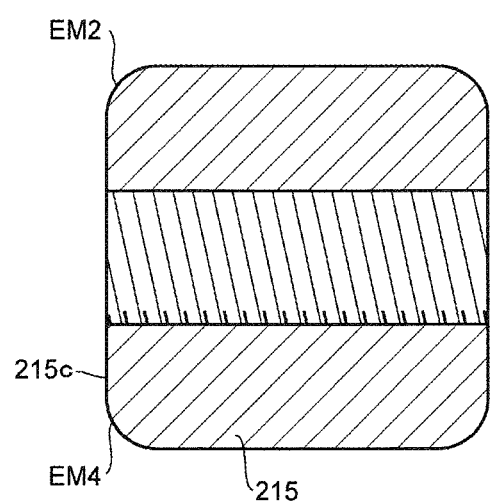
FIG. 8 is a cross section taken on the line VIII-VIII of FIG. 6.

The curved surfaces can be those as shown in FIG. 6 through FIG. 8. FIG. 6 is a perspective view of a threaded rod fixing member of a second embodiment. FIG. 7 is a cross section taken on the line VII-VII of FIG. 6. FIG. 8 is a cross section taken on the line VIII-VIII of FIG. 6. Referring to these drawings, corners of a third surface 215c and side surfaces of a threaded rod fixing member 215 are chamfered and respective curved surfaces are therefore convex cylindrical surfaces EM1 through EM4. In other words, the curved surfaces can be cylindrical surfaces that are centered on corresponding one of intersecting two axes and on the respective first through fourth surfaces.

Third Embodiment

Figure 9:
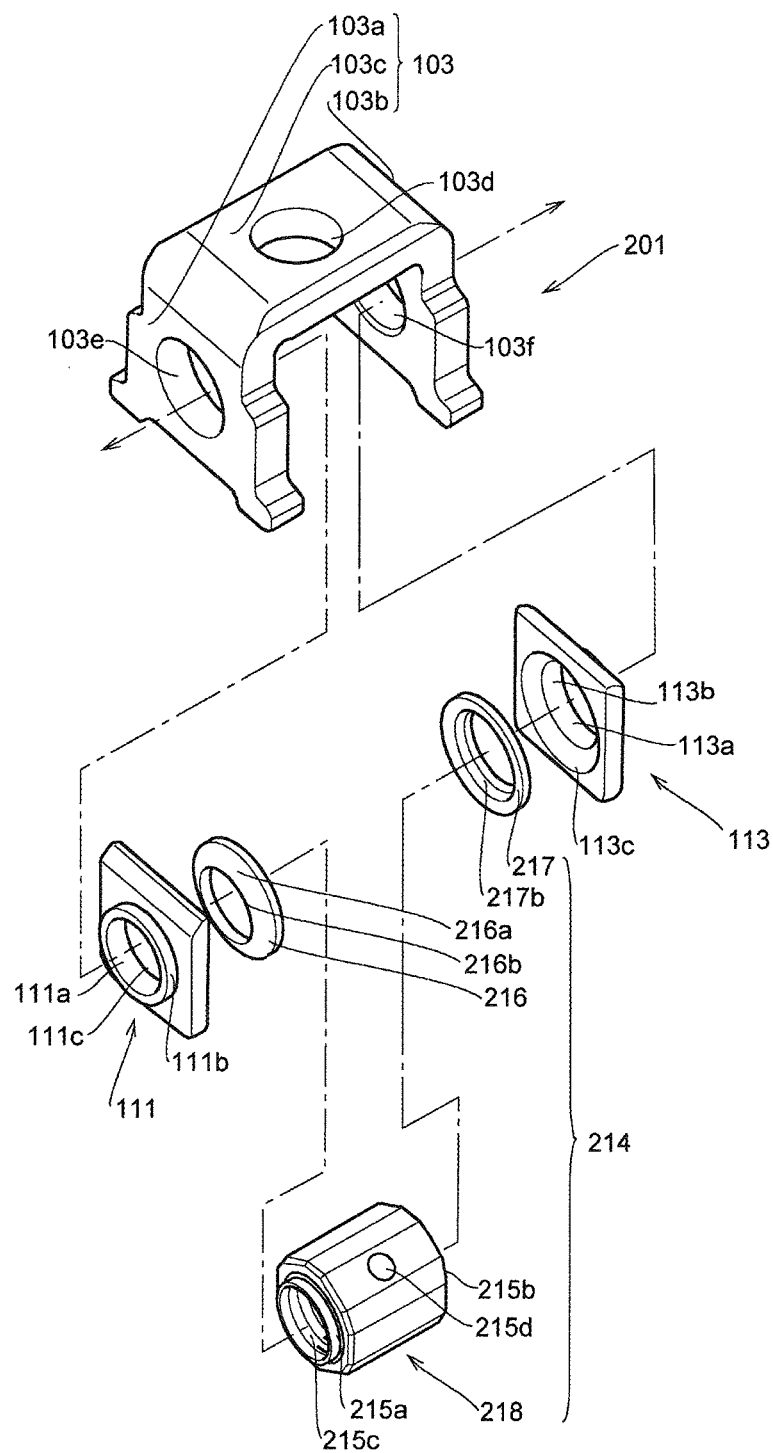
FIG. 9 is an exploded perspective view used to describe a third embodiment.

The threaded rod fixing member can be configured as shown in FIG. 9. FIG. 9 is an exploded perspective view of a load transmission mechanism of a third embodiment.

Portions same as those of the load transmission mechanism 101 shown in FIG. 4 are labeled with same reference numerals and a description is not repeated. A difference between a load transmission mechanism 201 of this embodiment and the load transmission mechanism 101 of the first embodiment above is a threaded rod fixing member (second load transmission member) 214. The threaded rod fixing member 214 of this embodiment is formed of three members: a main body portion 218, a third bush 216 provided to the main body portion 218 on a surface opposing the first surface 111c of the first bush 111 (first surface of the first load transmission member) and having a third surface 216a, and a fourth bush 217 provided to the main body portion 218 on a surface opposing the second surface 113c of the second bush 113 (second surface of the second load transmission member) and having an unillustrated fourth surface.

Further, a cylindrical standing wall portion 215a is provided on one end face of the main body portion 218. The third bush 216 is fixed to the main body portion 218 as the standing wall portion 215a fits into a through-hole 216b of the third bush 216. Also, a cylindrical standing wall portion (not shown) is provided on the other end face of the main body portion 218. The fourth bush 217 is fixed to the main body portion 218 as this standing wall portion fits into a through-hole 217b of the fourth bush 217.

The main body portion 218 is provided with a through-hole 215c that is female-threaded on an inner peripheral surface, and the small-diameter step portion 55b of the threaded rod 55 is threaded into the through-hole 215c. Further, because the main body portion 218 is fixedly attached to the threaded rod 55 by press working, an indentation 215d is left on the outer peripheral surface of the main body portion 218.

According to this embodiment, by molding either one of the first bush 111 and the third bush 216 and either one of the second bush 113 and the fourth bush 217 from resin, it becomes possible to reduce noises in comparison with a case where all these bushes are made of metal.

Fourth Embodiment

Figure 10:
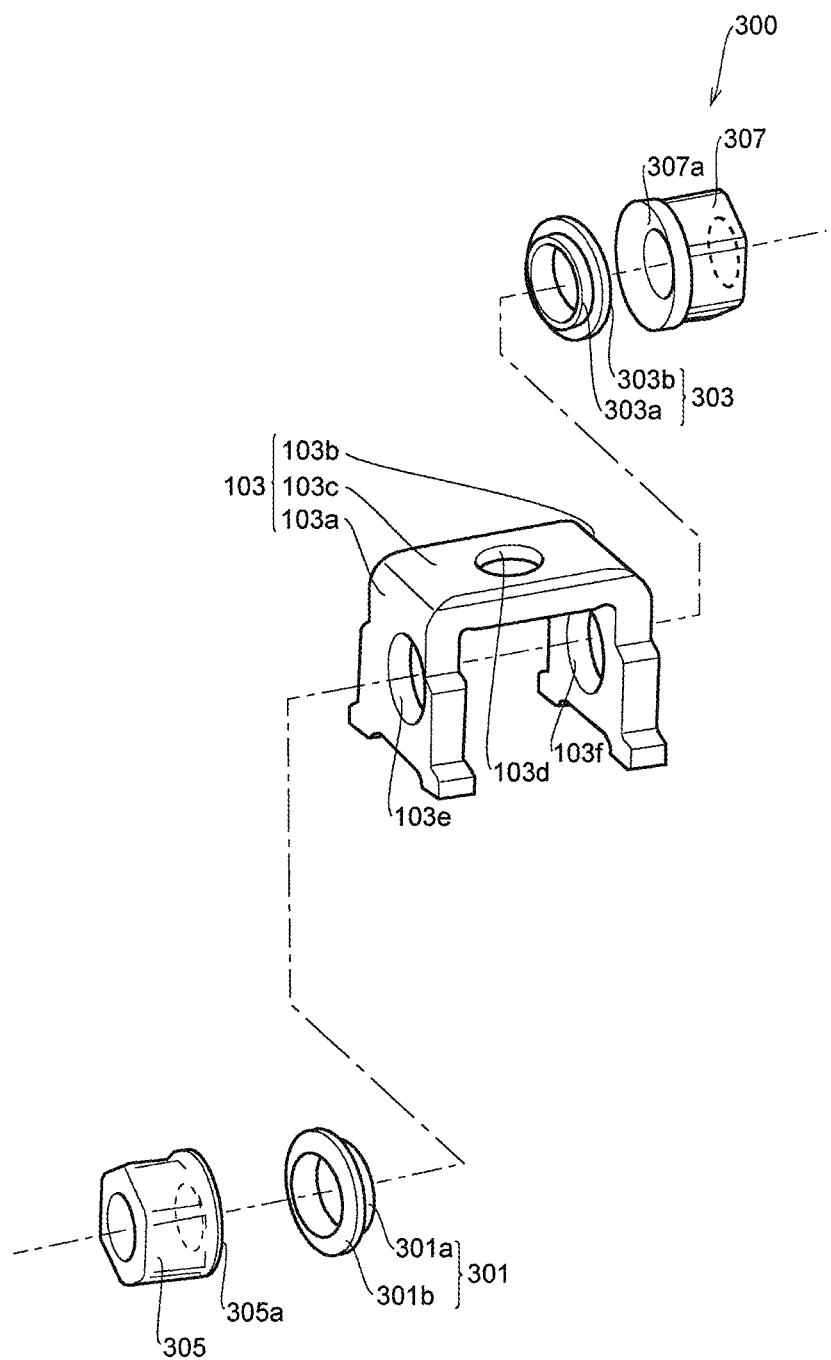
FIG. 10 is an exploded perspective view used to describe a fourth embodiment.

A fourth embodiment will be described using FIG. 10. The first through third embodiments above have described two load transmission members, that is, the first load transmission member and the second load transmission member. A load transmission mechanism 300 of this embodiment is an example having three load transmission members. Same portions as those of the load transmission mechanism 101 shown in FIG. 4 are labeled with same reference numerals and a description is not repeated.

Referring to the drawing, a bracket 103 as the first load transmission member is attached to an unillustrated upper rail. A first standing wall portion (first intersecting portion) 103a of the bracket 103 is provided with a hole 103e through which to insert a screw. A first bush 301 is formed of a cylindrical neck portion 301a fit into the hole 103e and a ring-like head portion 301b having an outer diameter larger than a diameter of the hole 103e. A surface of the head portion 301b on a side opposite to the neck portion 301a is a convex spherical surface and serves as a first surface that receives a load in one relative movement direction (forward) of the upper rail (first rail).

A second standing wall portion (second intersecting portion) 103b is provided with a hole 103f through which to insert a screw. A second bush 303 is formed of a cylindrical neck portion 303a fit into the hole 103f and a ring-like head portion 303b having an outer diameter larger than a diameter of the hole 103f. A surface of the head portion 303b on a side opposite to the neck portion 303a is a convex spherical surface and serves as a second surface that receives a load in the other relative movement direction (rearward) of the upper rail (first rail).

In this embodiment, a hole 103d of a bridge portion 103c of the bracket 103 is provided in such a manner that the center of the hole 103d is positioned at the center of the bridge portion 103c. In a state where the neck portion 301a of the first bush 301 is fit into the hole 103e and the neck portion 303a of the second bush 303 is fit into the hole 103f, the spherical surface forming the head portion 301b of the first bush 301 and the spherical surface of the head portion 303b of the second bush 303 are apart of a surface of a sphere about an intersection of an axis of the screw and an axis of the hole 103d of the bridge 103c.

A second load transmission member and a third load transmission member are fixedly attached to an unillustrated threaded rod. The second load transmission member is a forward load receiving nut 305 that can be screwed together with the threaded rod and abuts on the first surface (first bush 301). The third load transmission member is a rearward load receiving nut 307 that can be screwed together with the threaded rod and abuts on the second surface (second bush 303).

The forward load receiving nut 305 and the rearward load receiving nut 307 are screwed together with the threaded rod and fixedly attached to the threaded rod at predetermined positions by press working or by any other appropriate means.

A surface (third surface) 305a of the forward load receiving nut 305, which is a surface abutting on the first surface (first bush 301), is a concave spherical surface. Also, a surface (fourth surface) 307a of the forward load receiving nut 307, which is a surface abutting on the second surface (second bush 303), is a concave spherical surface.

Owing to the configuration above, errors of the component accuracy and attachment accuracy of the first load transmission member, the second load transmission member, and the third load transmission member are absorbed in an abutment portion of the first surface 301b of the first load transmission member and the third surface 305a of the second load transmission member and an abutment portion of the second surface 303b of the first load transmission member and the fourth surface 307a of the third load transmission member. Hence, no unusual sound is produced and an operational feeling becomes better.

It should be appreciated that the invention is not limited to this embodiment. Herein, the first surface is a convex curved (spherical) surface and the third surface is a concave curved (spherical) surface. However, it may be configured conversely in such a manner that the first surface is a concave curved surface and the third surface is a convex curved surface. Likewise, the second surface is a convex curved (spherical) surface and the fourth surface is a concave curved (spherical) surface herein. However, it may be configured conversely in such a manner that the second surface is a concave curved surface and the fourth surface is a convex curved surface.

Also, it is sufficient that at least one of the first and third surfaces is a convex curved surface. For example, it may be configured in such a manner that one surface is a convex curved surface and the other surface is a plane surface or the both surfaces are convex curved surfaces. The same applies to the second surface and the fourth surface.

Further, the curved surfaces are not limited to a spherical surface and can be other curved surfaces, such as an elliptical surface, a paraboloidal surface, and a hyperboloidal surface.

Furthermore, in this embodiment, the gearbox and the threaded rod are provided on the upper rail side and the nut member is provided on the lower rail side. It should be appreciated, however, that it maybe configured conversely in such a manner that the nut member is provided on the upper rail side and the gearbox and the threaded rod are provided on the lower rail side.

In addition, the first load transmission member is not limited to a fork-like member, such as the bracket 103, and can be of a shape as the support member 27 described in the related art column.

Fifth Embodiment

Figure 11:
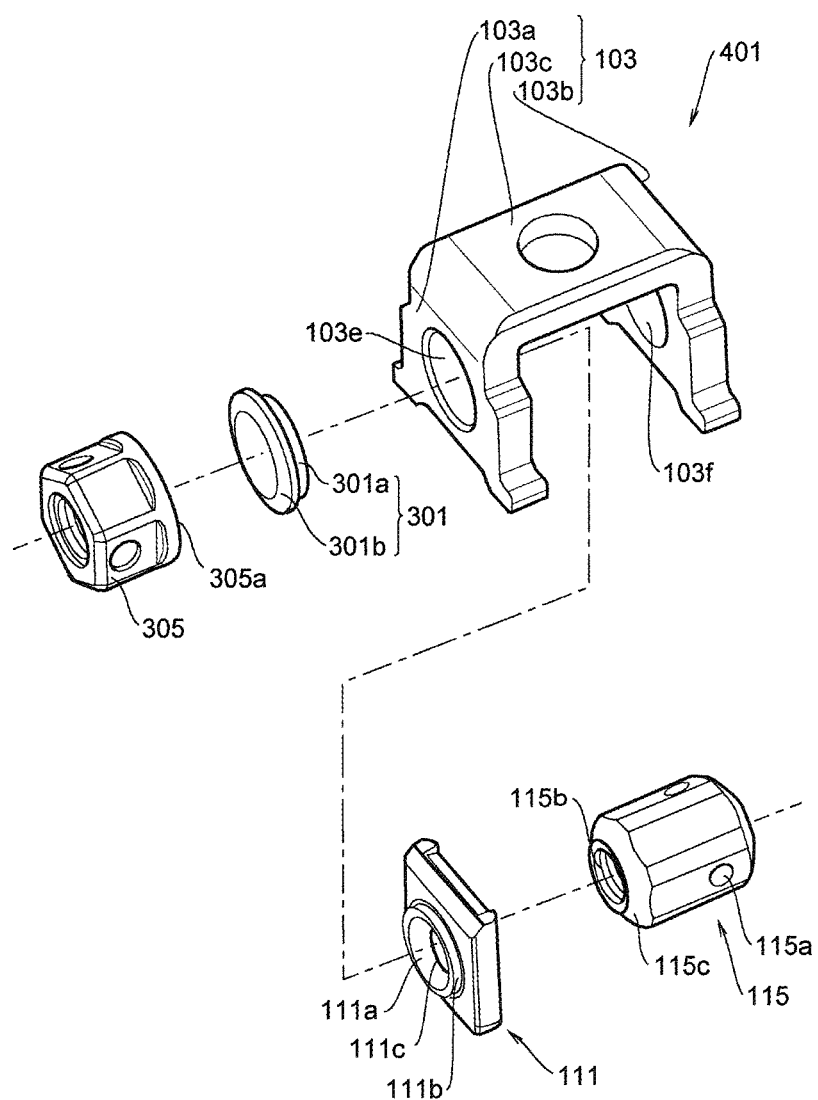
FIG. 11 is an exploded perspective view used to describe a fifth embodiment.

A fifth embodiment will be described using FIG. 11. In FIG. 11, portions same as those in FIG. 4 showing the first embodiment above and FIG. 10 showing the fourth embodiment above are labeled with same reference numerals, and a description is not repeated.

This embodiment is common with the fourth embodiment above in that both a load transmission mechanism 401 of the former and the load transmission member 300 of the latter are formed of three load transmission members. On the other hand, this embodiment is different from the fourth embodiment above in a manner in which the load transmission members are aligned.

In this embodiment, as is shown in FIG. 11, a second load transmission member (forward load receiving nut 305), a first load transmission member (bracket 103, bush 301 provided to first standing wall portion 103a, and bush 111 provided to first standing wall portion 103a), and a third load transmission member (threaded fixing member 115) are installed sequentially from left to right in the drawing.

The bush (first bush) 301 is provided to the first standing wall portion (intersecting portion) 103a of the bracket 103 on a surface opposing the forward load receiving nut 305. A spherical surface forming a head portion 301b of the bush 301 serves as a first surface opposing a surface (third surface) 305a of the forward load receiving nut 305.

Also, the bush (second bush) 111 is provided to the first standing wall portion 103a of the bracket 103 on a surface opposing the threaded rod fixing member 115. A first surface 111c forming the spherical surface of the bush 111 serves as a second surface opposing a surface (fourth surface) 115c of the threaded rod fixing member 115.

Owing to the configuration above, errors of the component accuracy and attachment accuracy of the first load transmission member, the second load transmission member, and the third load transmission member are absorbed in an abutment portion of the first surface 301b of the first load transmission member and the third surface 305a of the second load transmission member and an abutment portion of the second surface 111c of the first load transmission member and the fourth surface 115c of the third load transmission member. Hence, no unusual sound is produced and an operational feeling becomes better.

It should be appreciated that the invention is not limited to this embodiment. Herein, the first surface is a convex curved (spherical) surface and the third surface is a concave curved (spherical) surface. However, it may be configured conversely in such a manner that the first surface is a concave curved surface and the third surface is a convex curved surface. Likewise, the second surface is a convex curved (spherical) surface and the fourth surface is a concave curved (spherical) surface herein. However, it may be configured conversely in such a manner that the second surface is a concave curved surface and the fourth surface is a convex curved surface.

Also, it is sufficient that at least one of the first and third surfaces is a convex curved surface. For example, it may be configured in such a manner that one surface is a convex curved surface and the other surface is a plane surface or the both surfaces are convex curved surfaces. The same applies to the second surface and the fourth surface.

Further, the curved surfaces are not limited to a spherical surface and can be other curved surfaces, such as an elliptical surface, a paraboloidal surface, and a hyperboloidal surface.

Furthermore, in this embodiment, the gearbox and the threaded rod are provided on the upper rail side and the nut member is provided on the lower rail side. It should be appreciated, however, that it maybe configured conversely in such a manner that the nut member is provided on the upper rail side and the gearbox and the threaded rod are provided on the lower rail side.

In addition, the first load transmission member is not limited to a fork-like member, such as the bracket 103, and can be of a shape as the support member 27 described in the related art column.

Sixth Embodiment

Figure 12:
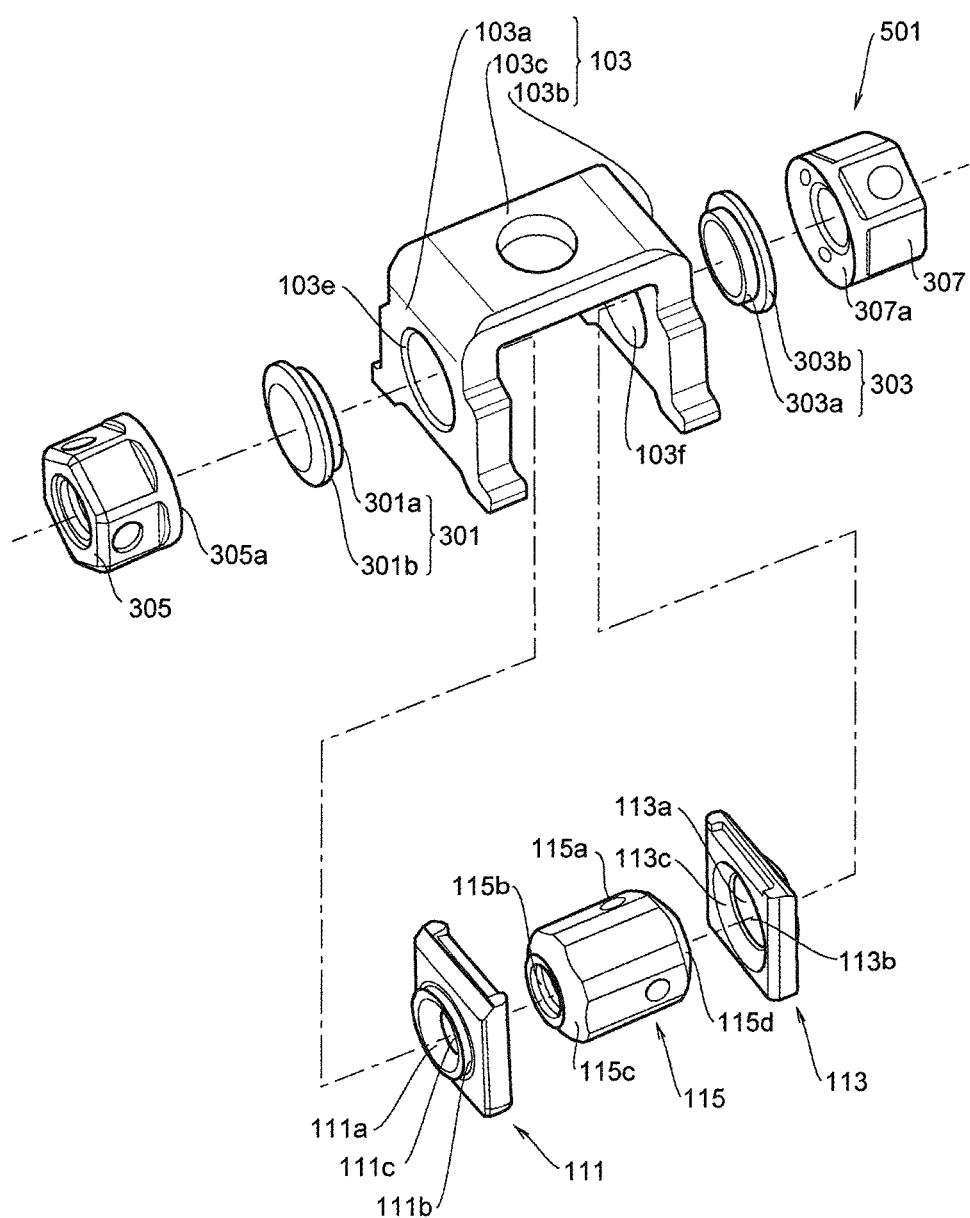
FIG. 12 is an exploded perspective view used to describe a sixth embodiment.
Figure 13:
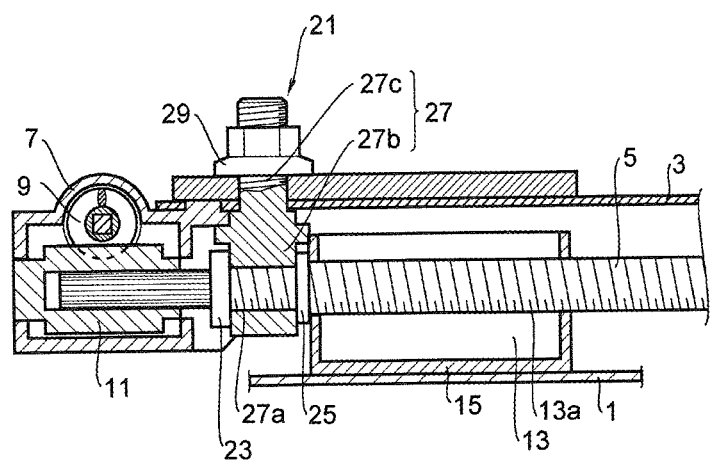
FIG. 13 is a longitudinal cross section of a power seat sliding apparatus in the related art.
Figure 14:
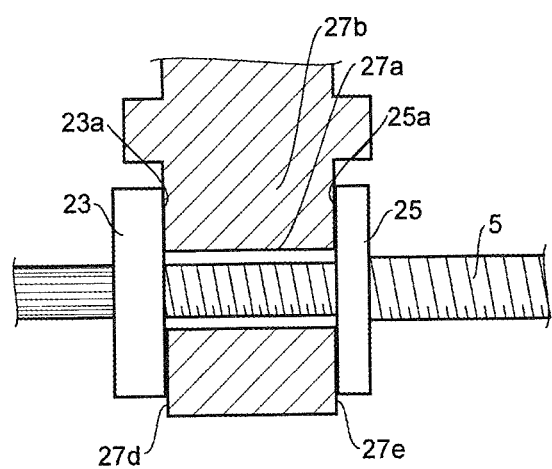
FIG. 14 is an enlarged view of a support member portion of FIG. 13.

A sixth embodiment will be described using FIG. 12. In FIG. 12, portions same as those in FIG. 4 showing the first embodiment above and FIG. 10 showing the fourth embodiment above are labeled with same reference numerals and a description is not repeated.

This embodiment is a combination of the first embodiment and the fourth embodiment above.

As is shown in the drawing, a load transmission mechanism 501 of this embodiment is formed of a bracket 103, a bush 301, a bush 111, a bush 113, and a bush 303 together as a first load transmission member, a forward load receiving nut 305 as a second load transmission member, a rear load receiving nut 307 as a third load transmission member, and a threaded rod fixing member 115 as a fourth load transmission member.

A spherical surface forming a head portion 301*b* of the bush 301 of the bracket 103 serves as a first surface that receives a forward load of an unillustrated upper rail. A surface (spherical surface) 113*c* of the bush 113 of the bracket 103 serves as a sixth surface that receives a forward load of the upper rail.

A surface (spherical surface) 111*c* of the bush 111 of the bracket 103 serves as a second surface that receives a rearward load of the upper rail. A spherical surface forming a head portion 303*b* of the bush 303 of the bracket 103 serves as a fifth surface that receives a rearward load of the upper rail.

A surface (spherical surface) 305*a* of the forward load receiving nut 305 serves as a third surface that abuts on the spherical surface (first surface) forming the head portion 301*b* of the bush 301 of the bracket 103.

A surface (spherical surface) 307*a* of the rearward load receiving nut 307 serves as a fourth surface that abuts on the spherical surface (fifth surface) forming the head portion 303*b* of the bush 303 of the bracket 103.

A surface (spherical surface) 115*c* of the threaded rod fixing member 115 serves as an eighth surface that abuts on the surface (spherical surface, second surface) 111*c* of the bush 111 of the bracket 103.

A surface 115*d* of the threaded rod fixing member 115 serves as a seventh surface that abuts on the surface (spherical surface, sixth surface) 113*c* of the bush 113 of the bracket 103.

Owing to the configuration above, advantages as follows can be obtained in addition to the advantage of the fifth embodiment above.

A forward load of the upper rail is received at two points and a rearward load of the rail is also received at two points.

Hence, when a forward or rearward load of the upper rail acts on the load transmission mechanism 501, the load is divided to two points and transmitted to the floor. It thus becomes possible to transmit a large load.

Even in a case where a load is transmitted at one of the two points alone due to a dimensional error of the components or any other reasonable cause, deformation takes place at one point when a load is large, and the load is transmitted also at the other point. In other words, in a case where a large load acts on the load transmission mechanism 501, the load is eventually transmitted via two routes. Hence, it becomes possible to transmit a large load.

It should be appreciated that the invention is not limited to this embodiment. The first surface and the third surface maybe formed conversely as a convex curved (spherical) surface and a concave curved (spherical) surface, respectively. Also, it is sufficient that at least one of the first and third surfaces is a convex curved surface. For example, it may be configured in such a manner that one surface is a convex curved surface and the other surface is a plane surface or the both surfaces are convex curved surfaces. The same applies to sets of the second surface and the eighth surface, the fifth surface and the fourth surface, and the sixth surface and the seventh surface.

What is claimed is:

1. A power seat sliding apparatus, comprising:
a first rail provided on one of a floor side and a seat side;
a second rail provided on an other one of the floor side and the seat side and engaged with the first rail in a relatively movable manner;
a threaded rod installed along the first rail and supported on the first rail in a rotatable manner;
a nut member fixed to the second rail and screwed together with the threaded rod;
a gearbox driven by a motor and driving the threaded rod to rotate, wherein the threaded rod is inserted into the gearbox;
a first load transmission member fixedly attached to one of the threaded rod and the first rail and having a first surface orthogonal to an axis of the threaded rod and a second surface opposing the first surface with a space in between; and
a second load transmission member installed in the space between the first surface and the second surface, fixedly attached to an other one of the threaded rod and the first rail, and having a third surface that abuts on the first surface and a fourth surface that abuts on the second surface,
wherein:
at least one of the first surface and the third surface is a convex curved surface; and
at least one of the second surface and the fourth surface is a convex curved surface.

2. The power seat sliding apparatus according to claim 1, wherein the convex curved surfaces are surfaces which have a same radius centered on a rotation axis of the threaded rod.

3. The power seat sliding apparatus according to the claim 2, wherein one of the first surface and the third surface is a convex curved surface and an other is a concave curved surface, and wherein one of the second surface and the fourth surface is a convex curved surface and an other is a concave curved surface.

4. The power seat sliding apparatus according to claim 2, wherein:
each curved surface is one of cylindrical surfaces that are centered on corresponding one of intersecting two axes and on the first through fourth surfaces.

5. The power seat sliding apparatus according to claim 1, wherein one of the first surface and the third surface is the convex curved surface, and
wherein the convex curved surface continuously abuts an other of the first surface and the third surface while the threaded rod is rotating.

6. The power seat sliding apparatus according to claim 5, wherein the second load transmission member is formed of:
a main body portion;
a third bush provided to the main body portion on a surface opposing the first surface of the first load transmission member and has the third surface; and
a fourth bush provided to the main body portion on a surface opposing the second surface of the first load transmission member and has the fourth surface.

7. The power seat sliding apparatus according to claim 1, wherein:
each curved surface is a spherical surface.

8. A power seat sliding apparatus, comprising:
a first rail provided on one of a floor side and a seat side;
a second rail provided on an other one of the floor side and the seat side and engaged with the first rail in a relatively movable manner;
a threaded rod installed along the first rail and supported on the first rail in a rotatable manner;
a nut member fixed to the second rail and screwed together with the threaded rod;
a gearbox driven by a motor and driving the threaded rod to rotate, wherein the threaded rod is inserted into the gearbox;
a first load transmission member fixedly attached to one of the threaded rod and the first rail and having a first surface and a second surface, which are orthogonal to an axis of the threaded rod; and
a second load transmission member fixedly attached to an other one of the threaded rod and the first rail, and having a third surface that abuts on the first surface and a fourth surface that abuts on the second surface, wherein:
one of the first surface and the third surface is a convex curved surface and an other is a concave curved surface; and
one of the second surface and the fourth surface is a convex curved surface and an other is a concave curved surface.

9. The power seat sliding apparatus according to claim 8, wherein the convex curved surfaces are surfaces which have a same radius centered on a rotation axis of the threaded rod.

10. The power seat sliding apparatus according to claim 9, wherein one of the first surface and the third surface is the convex curved surface, and
wherein the convex curved surface continuously abuts an other of the first surface and the third surface while the threaded rod is rotating.

* * * * *